US009457944B2

(12) United States Patent
Meier et al.

(10) Patent No.: US 9,457,944 B2
(45) Date of Patent: Oct. 4, 2016

(54) WATER-SOLUBLE PACKAGING WITH BITTERING AGENT

(71) Applicant: Henkel AG & Co. KGaA, Duesseldorf (DE)

(72) Inventors: Frank Meier, Duesseldorf (DE); Martina Hermann, Duesseldorf (DE); Brigitte Giesen, Duesseldorf (DE); Leyla Kolling, Hilden (DE); Matthias Sunder, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/621,435

(22) Filed: Feb. 13, 2015

(65) Prior Publication Data

US 2015/0158646 A1 Jun. 11, 2015

Related U.S. Application Data

(63) Continuation of application No. PCT/EP2013/066200, filed on Aug. 1, 2013.

(30) Foreign Application Priority Data

Aug. 16, 2012 (DE) ........................ 10 2012 214 608

(51) Int. Cl.

| | |
|---|---|
| ***C08K 5/15*** | (2006.01) |
| ***B65D 65/46*** | (2006.01) |
| ***C11D 17/04*** | (2006.01) |
| ***B65B 1/02*** | (2006.01) |
| ***B65B 1/04*** | (2006.01) |
| ***B65B 7/00*** | (2006.01) |

(52) U.S. Cl.

CPC ................. *B65D 65/46* (2013.01); *B65B 1/02* (2013.01); *B65B 1/04* (2013.01); *B65B 7/00* (2013.01); *C11D 17/042* (2013.01); *C11D 17/043* (2013.01); *C11D 17/045* (2013.01); *B65D 2215/00* (2013.01)

(58) Field of Classification Search

CPC ........... B65D 65/46; B65B 1/02; B65B 1/04; B65B 7/00

USPC ............................................................ 524/56

See application file for complete search history.

(56) References Cited

U.S. PATENT DOCUMENTS

| | | | | |
|---|---|---|---|---|
| 5,783,541 A * | 7/1998 | Tack | C11D 3/3753 | 510/224 |
| 2006/0122089 A1* | 6/2006 | Lambotte | C11D 17/0004 | 510/295 |

FOREIGN PATENT DOCUMENTS

| | | | |
|---|---|---|---|
| DE | 10033827 | A1 | 1/2002 |
| EP | 1375637 | A1 | 1/2004 |
| EP | 2196531 | A1 | 6/2010 |
| WO | 96/08555 | A1 | 3/1996 |

OTHER PUBLICATIONS

Research Disclosure RD 216006, Apr. 1982.*
PCT International Search Report (PCT/EP2013/066200) dated Sep. 12, 2013.
European Pharmacopoeia, 5th Edition, Stuttgart 2005, vol. 1, General Part, Monograph Groups, 2.8. 15 Bitterness Value, p. 278.

* cited by examiner

*Primary Examiner* — Hui Chin
(74) *Attorney, Agent, or Firm* — Thomas G. Krivulka

(57) ABSTRACT

The invention relates to a water-soluble packaging containing an agent and a water-soluble wrapping. Said water-soluble wrapping contains a bittering agent in a dilution of at least 1:250.

8 Claims, No Drawings

WATER-SOLUBLE PACKAGING WITH BITTERING AGENT

FIELD OF THE INVENTION

The present invention generally relates to water-soluble packaging containing an agent and a water-soluble wrapping. The invention further relates to a method for manufacturing water-soluble packaging.

BACKGROUND OF THE INVENTION

Detergents or cleaning agents are presently available to the consumer in various forms. In addition to powders and granules, these offered forms also include liquids, gels, or single-dose packages (tablets or filled pouches), for example.

In particular single-dose packages in the form of water-soluble packaging containing liquid detergents or cleaning agents are becoming increasingly popular; on the one hand they meet the consumer's demand for simplified dosing, and on the other hand, consumers increasingly prefer liquid detergents or cleaning agents.

Such a water-soluble pouch contains an agent and a transparent, water-soluble wrapping.

A packaged cleaning agent for washing dishes is known from WO 96/08555 A1, and is coated with the bittering agent Bitrex® (denatonium benzoate) to prevent children from accidentally ingesting the packaged cleaning agent.

Denatonium benzoate is considered to be the bitterest substance known, and has a bitterness value greater than 100,000,000.

One disadvantage of coating water-soluble packaging with Bitrex® is that the users of the water-soluble packaging pick up the package for dosing, and thus also come into contact with the Bitrex®. If a user moves the hand toward the mouth after contacting the water-soluble packaging, even small quantities of Bitrex® remaining on the hand are sufficient to adversely affect the sense of taste for a few hours.

The object of the invention, therefore, is to provide water-soluble packaging having a high level of child-resistance, but without negative effects during normal use.

Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Water-soluble packaging which contains an agent and a water-soluble wrapping, in which the water-soluble wrapping contains a bittering agent in a dilution of at least 1:250.

Method for manufacturing water-soluble packaging which includes an agent and a water-soluble wrapping, including the following steps: forming at least one cavity in a first water-soluble film web; filling the at least one cavity with a product; and closing the cavity with a second water-soluble film web, characterized in that the first and/or second water-soluble film web contain(s) a bittering agent in a dilution of at least 1:250.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The object of the invention is achieved by water-soluble packaging which contains an agent and a water-soluble wrapping, in which the water-soluble wrapping contains a bittering agent in a dilution of at least 1:250.

It has surprisingly been shown that when the bittering agent is contained in the water-soluble wrapping, little or no bitter-tasting substances remain on the hand of a user of the water-soluble packaging during routine use of the water-soluble packaging, and therefore the taste buds of the user are not unpleasantly irritated, even in the event of accidental contact of the hand with the mouth.

Water-Soluble Packaging

The subject matter of the invention relates to water-soluble packaging containing an agent and a water-soluble wrapping. The water-soluble wrapping contains a bittering agent.

The water-soluble packaging contains a water-soluble wrapping which forms a closed structure having one or more chambers in its interior for accommodating one more agents. The water-soluble wrapping is preferably formed by a water-soluble film material.

The water-soluble packaging may have a dimensionally stable or a deformable design.

The water-soluble packaging may be designed as a dimensionally stable receptacle, for example in the form of a capsule, box, can, or container.

In principle, however, it is also possible and preferred to form the water-soluble packaging as a nondimensionally stable container, for example as a pouch. The shape of this type of water-soluble packaging may be adapted to a great extent to the use conditions. Various shapes such as tubes, cushions, cylinders, bottles, or disks are suitable.

The water-soluble packaging may have one or more chambers for storing one or more agents. The water-soluble packaging preferably has between two and five chambers.

Water-Soluble Wrapping

The water-soluble wrapping is preferably formed from a water-soluble film material which is selected from the group comprising polymers or polymer mixtures. The wrapping may be formed from one, two, or more layers of the water-soluble film material. The water-soluble film material of the first layer and of the additional layers, if present, may be the same or different. Particularly preferred are films which may be glued or sealed to form packaging such as tubes or cushions, for example, after they have been filled with an agent.

It is preferred that the water-soluble wrapping contains polyvinyl alcohol or a polyvinyl alcohol copolymer. Water-soluble wrappings which contain polyvinyl alcohol or a polyvinyl alcohol copolymer have good stability with sufficiently high solubility in water, in particular solubility in cold water.

Suitable water-soluble films for manufacturing the water-soluble wrapping are preferably based on a polyvinyl alcohol or a polyvinyl alcohol copolymer having a molecular weight in the range of 10,000 to 1,000,000 $gmol^{-1}$, preferably 20,000 to 500,000 $gmol^{-1}$, particularly preferably 30,000 to 100,000 $gmol^{-1}$, and in particular 40,000 to 80,000 $gmol^{-1}$.

Polyvinyl alcohol is typically produced by hydrolysis of polyvinyl acetate, since a direct synthetic route is not possible. The same applies for polyvinyl alcohol copolymers, which are correspondingly produced from polyvinyl acetate copolymers. It is preferred when at least one layer of the water-soluble wrapping contains a polyvinyl alcohol having a degree of hydrolysis of 70 to 100 mol-%, preferably 80 to 90 mol-%, particularly preferably 81 to 89 mol-%, and in particular 82 to 88 mol-%.

In addition, a polymer selected from the group comprising (meth)acrylic acid-containing (co)polymers, polyacrylamides, oxazoline polymers, polystyrene sulfonates, polyurethanes, polyesters, polyethers, polylactic acid, or mixtures of these polymers may be added to a polyvinyl alcohol-containing film material which is suitable for manufacturing the water-soluble wrapping. Polylactic acids are a preferred additional polymer.

In addition to vinyl alcohol, preferred polyvinyl alcohol copolymers include dicarboxylic acids as additional monomers. Suitable dicarboxylic acids are itaconic acid, malonic acid, succinic acid, and mixtures thereof, with itaconic acid being preferred.

Likewise preferred polyvinyl alcohol copolymers include, in addition to vinyl alcohol, an ethylenically unsaturated carboxylic acid, its salt, or its ester. In addition to vinyl alcohol, such polyvinyl alcohol copolymers particularly preferably contain acrylic acid, methacrylic acid, acrylic acid ester, methacrylic acid ester, or mixtures thereof.

It may be preferred that the film material of the water-soluble wrapping contains further additives. The film material of the water-soluble wrapping may contain, for example, softeners such as dipropylene glycol, ethylene glycol, diethylene glycol, propylene glycol, glycerin, sorbitol, mannitol, or mixtures thereof. Examples of further additives include release aids, fillers, crosslinking agents, surfactants, antioxidants, UV absorbers, antiblocking agents, non-stick agents, or mixtures thereof.

The water-soluble wrapping contains a bittering agent in a dilution of at least 1:250, and preferably in a dilution of at least 1:500.

In the present patent application, "dilution" is understood to mean the process of lowering the concentration of the buttering agent present in the water-soluble wrapping. A dilution of 1:250 means that one part bittering agent per 250 parts water-soluble wrapping is present in the water-soluble wrapping.

All chemical compounds which have a bitter taste are designated as bittering agents.

In one preferred embodiment, the water-soluble wrapping contains a bittering agent which preferably has a bitterness value of at least 10,000.

It is particularly preferred that the bittering agent has a bitterness value of at least 100,000. The higher the bitterness value, the less bittering agent that must be introduced into the water-soluble wrapping in order to produce a sufficiently high bitterness value of the water-soluble wrapping.

It has been shown that solutions of bittering agents in pure water have a significantly more bitter taste than solutions of the bittering agents in aqueous polyvinyl alcohol solutions. The effect becomes even greater when the aqueous polyvinyl alcohol solutions are dried to form polyvinyl alcohol films.

The bitterness value is the reciprocal value of the dilution of a substance, a liquid, or an extract which just has a bitter taste.

The standardized method described in the European Pharmacopoeia (5th Edition, Main Volume, Stuttgart 2005, Volume 1, General Part, Monograph Groups, 2.8.15 Bitterness Value, p. 278) is used to determine the bitterness value.

An aqueous solution of quinine hydrochloride, whose bitterness value is defined to be 200,000, is used as a comparison. This means that 1 gram quinine hydrochloride makes 200 liters of water bitter. The interindividual taste differences in the organoleptic testing of bitterness are compensated for by a correction factor in this method.

Suitable bittering agents having a bitterness value of at least 10,000, which may be contained in the film material for manufacturing the water-soluble wrapping, are natural or synthetic bittering agents. The natural bittering agents having a bitterness value of at least 10,000 are particularly preferably selected from the group comprising glycosides, isoprenoids, alkaloids, amino acids, and mixtures thereof.

Particularly preferred bittering agents having a bitterness value of at least 10,000 are naringin (bitterness value=10,000), saccharose octaacetate (bitterness value=100,000), quinine hydrochloride, denatonium benzoate (bitterness value>100,000,000), and mixtures thereof.

It has been shown that these bittering agents may be easily introduced into the water-soluble wrapping without destroying the structural integrity of the water-soluble wrapping.

For achieving a sufficiently bitter taste of the water-soluble wrapping, saccharose octaacetate is preferably used in a dilution of 1:1,000 to 1:500, and denatonium benzoate is preferably used in a dilution of 1:100,000 to 1:50,000.

The 25 genes responsible for sensing bitter taste, for which various additional variants also exist, have been decoded some time ago. If such a gene is not active, it does not form receptors for certain bittering agents on the surface of the tongue, and such a person is a so-called "nontaster." To ensure that the largest possible number of persons, in particular children, discern the bitter taste, the use of a mixture of various bittering agents may be advantageous.

The dilution of the bittering agent, and thus, the quantity of bittering agent in the water-soluble wrapping, depends in particular on the desired intensity of the bitter taste, and the other ingredients in the water-soluble wrapping. Thus, for example, the use of softeners such as sorbitol in the film material for forming the water-soluble wrapping may diminish the bitter taste of the water-soluble wrapping.

However, it is preferred that the quantity of bittering agent per water-soluble wrapping is between 10 and 4000 ppm.

Agents, in Particular Liquid, Gel, or Solid Detergent or Cleaning Agent, for Storing in the Water-Soluble Packaging In addition to the water-soluble wrapping, the water-soluble packaging contains an agent. This agent may be a solid agent, for example, and may include a powder, a granulate, or a tablet. Alternatively, the agent may be a liquid agent and may include a gel or a liquid. The agent is particularly preferably a liquid or solid detergent or cleaning agent, with liquid detergents or cleaning agents being particularly preferred.

In one embodiment, the water-soluble packaging has a chamber for accommodating the agent. In this embodiment the agent may preferably include a powder, a granulate, a gel, or a liquid.

In another embodiment, the water-soluble packaging has two chambers. In this embodiment the first chamber preferably contains a liquid agent and the second chamber preferably contains a solid or a liquid agent. Alternatively, both chambers may contain a solid agent.

If the water-soluble packaging has three chambers, all of these chambers may contain a liquid or a solid agent in each case. However, it is also possible for one chamber to contain solid agent and for two chambers to contain a liquid agent. In addition, it is possible for two chambers to contain a solid agent and for one chamber to contain a liquid agent.

For water-soluble packaging having four or more chambers, there are correspondingly more possible combinations with regard to the number of chambers containing a solid or a liquid agent.

The agents contained in the various chambers of a water-soluble packaging may have the same composition. In a water-soluble packaging having at least two chambers, the agents preferably have compositions which differ with respect to at least one ingredient or at least with respect to the content of one ingredient.

The agent contains ingredients which do not destroy the structural integrity of the water-soluble wrapping. If the agent used is a liquid or solid detergent or cleaning agent, it may contain one or more substances from the group of surfactants, builders, bleaching agents, bleaching activators, bleach catalysts, enzymes, enzyme stabilizers, electrolytes, pH adjusters, fragrances, fragrance carriers, fluorescence agents, dyes, hydrotopes, foam inhibitors, silicone oils, anti-redeposition agents, graying inhibitors, shrinkage inhibitors, anti-crease agents, dye transfer inhibitors, anti-microbial active substances, nonaqueous solvents, germicides, fungicides, antioxidants, preservatives, corrosion inhibitors, anti-static agents, bittering agents, ironing aids, repellent and impregnation agents, opacifiers, skin care active substances, swelling and anti-slip agents, softening components, fillers, and UV absorbers.

The liquid detergents or cleaning agents may contain water, the water content being less than 10% by weight and more preferably less than 8% by weight, in each case based on the total liquid detergent or cleaning agent.

Method for Manufacturing Water-Soluble Packaging

There are several options for manufacturing the water-soluble packaging according to the invention. In addition to the vertical form-fill-seal method, it is also possible in particular to use a horizontal form-fill-seal method.

The manufacture of water-soluble packaging may include the following steps:

a) Forming at least one cavity in a first water-soluble film web,
b) Filling the at least one cavity with an agent, and
c) Closing the cavity with a second water-soluble film web.

In a first embodiment, the first water-soluble film (web) may contain a bittering agent in a dilution of at least 1:250. Alternatively, the second water-soluble film (web) may contain a bittering agent in a dilution of at least 1:250. However, it is preferred that the first and second film webs contain a bittering agent in a dilution of at least 1:250.

If a bittering agent is contained in both water-soluble film (webs) in a dilution of at least 1:250, the bittering agent in the first film (web) may be the same as or different from the bittering agent in the second film (web).

Accordingly, a further subject matter of the patent application relates to a method for manufacturing water-soluble packaging which contains an agent and a water-soluble contains a bittering agent, including the following steps:

a) Forming at least one cavity in a first water-soluble film web,
b) Filling the at least one cavity with a product, and
c) Closing the cavity with a second water-soluble film web, wherein the first and/or second water-soluble film web contain(s) a bittering agent in a dilution of at least 1:250.

The manufacture of a water-soluble film (web) containing a bittering agent may take place, for example, by (a) combining a water-soluble polymer which preferably contains polyvinyl alcohol or a polyvinyl alcohol copolymer, alone or in combination, with at least one additional water-soluble polymer, a solvent, the bittering agent, and optionally further additives to form a matrix, (b) forming a film from the matrix, and (c) drying the film to form a water-soluble film (web).

The film may be formed by pouring and reverse roller coating, for example.

Alternatively, a water-soluble film (web) containing a bittering agent may be obtained by (a) combining a water-soluble polymer which preferably contains polyvinyl alcohol or a polyvinyl alcohol copolymer, alone or in combination, with at least one additional water-soluble polymer, a solvent, the bittering agent, and optionally further additives to form a matrix, and (b) obtaining a film (web) by extrusion of the matrix.

In both manufacturing methods, the bittering agent in the material for forming the film (web) is present in a dilution of at least 1:250.

The invention is explained in greater detail below with reference to two exemplary embodiments.

For manufacturing a water-soluble packaging which has a chamber that is filled with a liquid detergent or cleaning agent, first a liquid detergent or cleaning agent was produced using known, conventional methods and processes. Table 1 shows the composition of a liquid detergent or cleaning agent E1.

TABLE 1

Liquid detergent or cleaning agent E1 [all quantities are expressed in % by weight active substance, based on the composition]

| Ingredient | E1 |
|---|---|
| $C_{10}$-$C_{13}$ alkylbenzenesulfonic acid | 21 |
| $C_{13}$-$C_{15}$ oxo alcohol having 8 EO | 22.5 |
| $C_{12-18}$ fatty acid | 17.5 |
| Glycerin | 13 |
| 1,2-Propanediol | 13.5 |
| Ethanol | 3.26 |
| Phosphonate | 0.3 |
| Monoethanolamine | 6.4 |
| Dyes, enzymes (cellulase, amylase, protease), optical brightener, fragrance | 0.8 |
| Water | 1.74 |

For manufacturing water-soluble packaging V1 containing the liquid detergent or cleaning agent E1, a film of type M 8630 (from Monosol) having a thickness of 76 μm was pulled by vacuum into a cavity to form a protrusion. The protrusion was subsequently filled with 30 mL of the liquid detergent or cleaning agent E1. After covering the protrusions, filled with the agent, with a second layer of a film containing polyvinyl alcohol, polylactic acid, 1,2-propanediol, and glycerin and having a thickness of 76 μm, the first and second layers were sealed together. The sealing temperature was 150° C., and the sealing duration was 1.1 seconds. The first and second film webs each contained saccharose octaacetate in a dilution of 1:500.

In another exemplary embodiment, a water-soluble packaging V2 containing the liquid detergent or cleaning agent E1 was produced in which, instead of saccharose octaacetate, the films contained denatonium benzoate in a dilution of 1:500,000.

In both cases, a quickly discernible, unpleasant bitter taste of the film (webs) used was confirmed by a panel of 10 individuals.

After 4, 8, and 12 week storage time of the water-soluble packaging V1 and V2 under various climatic conditions, no solubilization or dissolution of the water-soluble wrapping was observable. In addition, no pores or holes were identified which would likewise result in escape or leakage of product.

Water-soluble packagings V1 and V2 dissolved without residue in wash operations at temperatures in a range from 20 to 95° C.

In addition, no transfer of the bittering agents to the skin was identifiable upon contact of the two water-soluble packagings V1 and V2 with skin, in particular upon contact with dry or slightly damp hands.

The determination of whether a persistent and/or objectionable transfer of the bittering agent was present was made with the assistance of 10 test subjects who held a water-soluble package tightly in the hand for 5 seconds and subsequently brought the hand into contact with the tongue for 5 seconds. For both water-soluble packagings V1 and V2, all of the test subjects noticed no bitter taste, or noticed a slightly unpleasant bitter taste which only lasted for 1 minute maximum.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. Water-soluble packaging comprising an agent and a water-soluble wrapping comprising a film obtained by extruding a matrix comprising water-soluble polymers, and a bittering agent in a dilution of at least 1:250.

2. Water-soluble packaging according to claim 1, wherein the water-soluble wrapping comprises the bittering agent in a dilution of at least 1:500.

3. Water-soluble packaging according to claim 1, wherein the bittering agent has a bitterness value of at least 10,000.

4. Water-soluble packaging according to claim 3, wherein the bittering agent is selected from the group consisting of naringin, saccharose octaacetate, denatonium benzoate, and mixtures thereof.

5. Water-soluble packaging according to claim 1, wherein the water-soluble wrapping comprises polyvinyl alcohol or a polyvinyl alcohol copolymer.

6. Water-soluble packaging according to claim 1, wherein the water-soluble wrapping further comprises a compound selected from the group consisting of dipropylene glycol, ethylene glycol, diethylene glycol, propylene glycol, glycerin, sorbitol, mannitol, and mixtures thereof.

7. Water-soluble packaging according to claim 1, wherein the water-soluble packaging comprises two to five chambers.

8. Method for manufacturing water-soluble packaging which includes an agent and a water-soluble wrapping, including the following steps:

a) forming at least one cavity in a first water-soluble film web, b) filling the at least one cavity with a product, and c) closing the cavity with a second water-soluble film web, wherein the first and/or second water-soluble film web is obtained by extruding a matrix comprising water-soluble polymers, and a bittering agent in a dilution of at least 1:250.

* * * * *